United States Patent
Steffey et al.

(10) Patent No.: US 6,879,933 B2
(45) Date of Patent: Apr. 12, 2005

(54) METHOD AND SYSTEM FOR ASSISTING A USER TAKING MEASUREMENTS USING A COORDINATE MEASUREMENT MACHINE

(75) Inventors: Kenneth Steffey, Sanford, FL (US); Tom Schenck, Lake Mary, FL (US); Dan Perreault, Owings Mill, MD (US); Paul Atwell, Lake Mary, FL (US)

(73) Assignee: Faro Technologies, Inc., Lake Mary, FL (US)

( * ) Notice: Subject to any disclaimer, the term of this patent is extended or adjusted under 35 U.S.C. 154(b) by 81 days.

(21) Appl. No.: 10/295,759

(22) Filed: Nov. 15, 2002

(65) Prior Publication Data

US 2003/0125901 A1 Jul. 3, 2003

Related U.S. Application Data

(60) Provisional application No. 60/332,315, filed on Nov. 16, 2001.

(51) Int. Cl.[7] .......................... G06F 15/00; G01B 5/004
(52) U.S. Cl. ........................................ 702/155; 33/503
(58) Field of Search .......................... 702/155; 33/503; 703/1

(56) References Cited

U.S. PATENT DOCUMENTS

| | | | | |
|---|---|---|---|---|
| 4,918,627 A | * | 4/1990 | Garcia et al. | 702/82 |
| 5,198,990 A | | 3/1993 | Farzan et al. | |
| 5,323,333 A | * | 6/1994 | Johnson | 703/1 |
| 5,440,478 A | | 8/1995 | Fisher et al. | |
| 5,465,221 A | | 11/1995 | Merat et al. | |
| 5,510,977 A | * | 4/1996 | Raab | 700/66 |
| 5,586,052 A | * | 12/1996 | Iannuzzi et al. | 703/1 |
| 5,771,044 A | * | 6/1998 | Cragun et al. | 345/420 |
| 5,949,693 A | * | 9/1999 | Tandler | 703/1 |
| 5,956,251 A | * | 9/1999 | Atkinson et al. | 700/109 |
| 6,161,079 A | * | 12/2000 | Zink et al. | 702/168 |
| 6,507,806 B1 | * | 1/2003 | Tandler | 703/1 |
| 6,612,044 B2 | * | 9/2003 | Raab et al. | 33/503 |
| 2001/0040995 A1 | | 11/2001 | Ariga et al. | |

FOREIGN PATENT DOCUMENTS

| | | |
|---|---|---|
| EP | 1 136 897 A2 | 9/2001 |
| WO | WO 01 29624 A | 4/2001 |

OTHER PUBLICATIONS

Tsai et al., Development of a Step–based Dimensioning and Tolerance Data Model, 1998, Proc. Natl. Sci. Counc. ROC(A), vol. 22, No. 6, pp. 831–840.*
Lee et al., Assemblability Evaluation Based on Tolerance Propagation, 1995, IEEE Inter. Conf. on Robotics and Automation.*
Lujan et al., Applied Geometric Tolerancing in Accelerator Component Design, May 6–9, 1991, Particle Accelerator Conf., 1991 IEEE, vol. 4, pp. 2453–2455.*
PCT International Publication No. WO 01/29624 A2.
Search Report PCT/US 02 / 36996.

* cited by examiner

Primary Examiner—Michael Nghiem
Assistant Examiner—Toan M. Le
(74) Attorney, Agent, or Firm—Cantor Colburn LLP

(57) ABSTRACT

A method and system for testing a target object for compliance with existing geometric dimension and tolerance requirements includes: measuring a selected feature of the target and entering the existing geometric dimension and tolerance requirements into a user interface. Entering includes selecting an icon containing a graphic symbol representative of a geometric dimension and tolerance characteristic.

17 Claims, 16 Drawing Sheets

| Symbol | Characteristic | 5 Types |
|---|---|---|
| ▱ | Flatness | Form |
| — | Straightness | Form |
| ◯ | Circularity | Form |
| ⌭ | Cylindricity | Form |
| ⌒ | Profile of a Line | Profile |
| ⌓ | Profile of a Surface | Profile |
| ⊥ | Perpendicularity | Orientation |
| ∠ | Angularity | Orientation |
| ∥ | Parallelism | Orientation |
| ↗ | Circular Runout | Runout |
| ↗↗ | Total Runout | Runout |
| ⌖ | Position | Location |
| ◎ | Concentricity | Location |
| ═ | Symmetry | Location |

*FIG. 2*

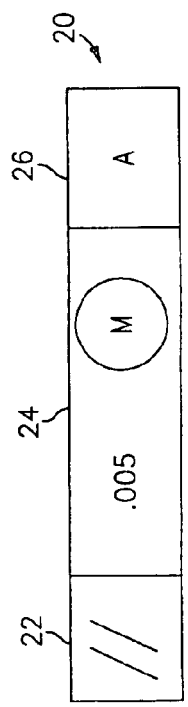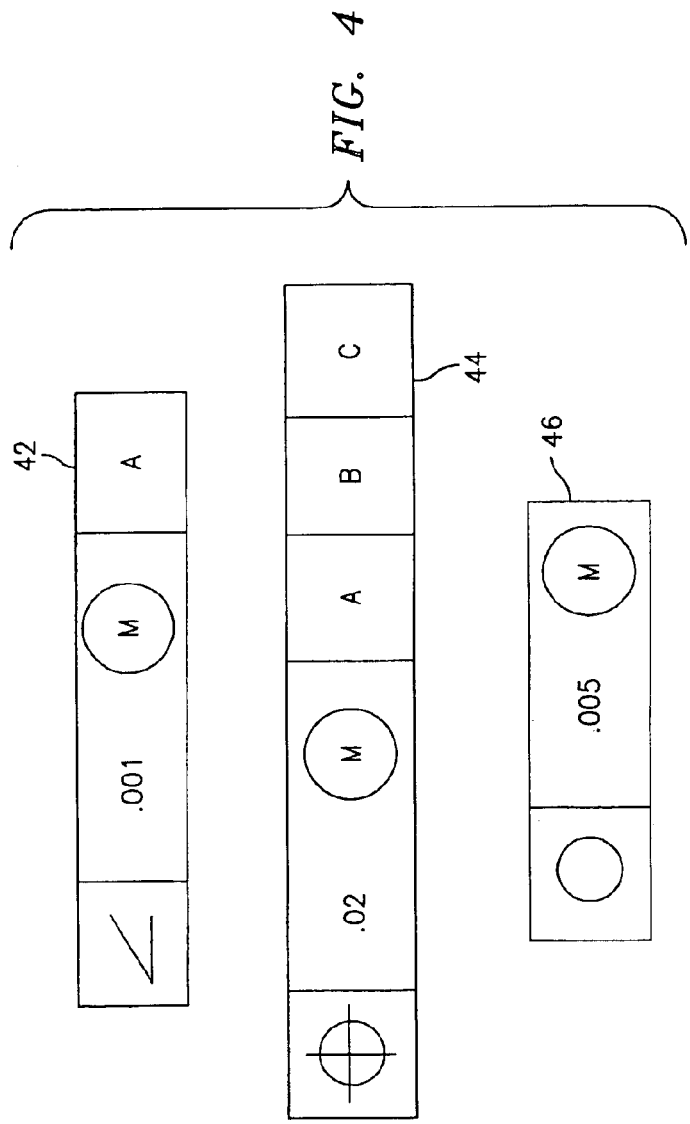

| Label: C_Circularity_1 | | | |
|---|---|---|---|
| ○ | Tolerance | Deviation | Out of Tolerance |
|  | 0.030 | 0.026 | ******* |

METHOD AND SYSTEM FOR ASSISTING A USER TAKING MEASUREMENTS USING A COORDINATE MEASUREMENT MACHINE

CROSS REFERENCE TO RELATED APPLICATIONS

This application claims benefit of the U.S. provisional patent application 60/332,315, filed Nov. 16, 2001, said provisional application being hereby incorporated by reference in its entirety.

BACKGROUND

The invention relates in general to coordinate measurement machines (CMMs) and in particular to a method and system for assisting a user taking measurements using a CMM.

The manufacturing/industrial marketplace took on a new face during the 1980's with the introduction of computer-aided design (CAD) and computer-aided manufacturing (CAM). While CAD allowed engineers to produce 3-D images in the front end of the design process, which shortened the production cycle and led to tremendous gains in productivity, CAM software and equipment increased the efficiency and quality of machined single parts. In essence, these new technologies revolutionized the marketplace by increasing productivity, improving quality, and reducing costs.

Despite these technological advances in design and manufacturing, something important was missing from the production cycle: a highly accurate, efficient, and convenient measurement methodology for ensuring that the products and components—both on and off the production line—met the original CAD specifications. The design process, with the help of CAD, had become innovative and sophisticated; so too, had the machining process through CAM. Yet measuring the assemblies made of these parts against the CAD model, for the most part, has continued to remain unwieldy, expensive, and unreliable.

Traditionally, the measurement and quality inspection function in the manufacturing process has been time-consuming and limited in size, scope, and effectiveness for a number of reasons. Manual measurement tools, such as calipers and scales may be slow, imprecise, and always one-dimensional. Analog test fixtures are costly and inflexible. And standard stationary CMMs while providing a high degree of precision, are generally located in quality control labs or inspection departments at a distance from the manufacturing floor. Parts must be removed one at a time and transported to the lab for inspection. As a result, CMMs measure only small, readily-moved subassemblies and components—which often translates into significant "down time" for the production line. In essence, traditional measurement techniques—also known as metrology—have lagged far behind in the technological advance of the production process.

The CAD/CAM and metrology markets, as well as a worldwide emphasis on quality in all aspects of the manufacturing process, are driving the need for an extension of the CAD/CAM techniques, which the inventor refers to as computer-aided manufacturing measurement. This last phase of the CAD revolution has remained incomplete because of the significant technical demands for adaptive measurement hardware and usable CAD-based measurement software for the difficult manufacturing environment. Therefore, there exists a need to take conventional metrology from a single-parts-only, high-level precision testing methodology to a whole products, intermediate-level precision measurement system at every step of the manufacturing process at any location on the factory floor. Measurements of part dimensions and/or characteristics may be made on the production floor to determine compliance with design specifications and ensure quality.

Previously, inspections to determine compliance with design specifications required highly skilled inspection personnel who could understand and interpret the associated documents. Geometric dimensioning and tolerancing (GD&T) requirements further complicated the inspection process.

GD&T is a mathematical language using specific terms and symbols to define a part's size, form, orientation and location of features based on how the part will function in the final product. Therefore, GD&T allows a designer to define a part's dimensions based on the part's final usage. In other words, GD&T is essentially a language used for "functional dimensioning." Using GD&T to define a part allows greater design freedom and lower manufacturing costs. Without GD&T, a designer might arbitrarily and unknowingly define a part's tolerances too tight for cost effective manufacturing.

FIG. 2 shows a chart with various GD&T symbols and the corresponding characteristic. GD&T data is typically represented in a format known as a document feature control frame shown by way of example in FIG. 3. A standard convention exists for the creation of the document feature control frame. The document feature control frame is typically found on a document such as a design drawing, specification or part of a digital definition of a part. The standard convention stipulates a number of tolerances and data features, which should be used in determining the acceptability of the corresponding part. The internationally accepted standard is ASME Y14.5M-1994 (American Society of Mechanical Engineers) or ISO 1101 (International Organization for Standardization). Many hours of training are required to become proficient in applying and using tolerance standards such as ASME Y14.5M-1994/ISO 1101.

For example, to inspect an automobile quarter panel that attaches to a mating part with five slots, all surfaces may require tolerancing with respect to the slots. Typically, the inspector must first review the document corresponding to the panel, and any GD&T data thereon. Next, the inspector must take measurements and perform complex mathematical calculations based on the data in the document feature control frame 20. Thus, determining the appropriate measurements and calculations during an inspection required technical skill in addition to GD&T training. Usually, only highly trained individuals, such as engineers and skilled technicians with GD&T training, could interpret tolerance requirements and plan an accurate approach to measuring and inspecting the corresponding part.

Even in situatons where a computer is assisting in the calculations, a thorough understanding of GD&T is necessary to interpret the symbols and numbers provided on a formal engineering drawing containing GD&T information. Prior automated systems did not track datum designations and relied on the user to select part features corresponding to datums identified in the formal drawing from a generic list of measured features, making the tolerance evaluation unnecessarily tedious and prone to mistakes.

Therefore, there exists a need for a system and method for assisting a user, such as a machinist or a person without technical or GD&T training, in taking measurements using a CMM.

SUMMARY

Disclosed is a method and system for testing a target object for compliance with existing geometric dimension and tolerance requirements comprising: measuring a selected feature of the target and entering the existing geometric dimension and tolerance requirements into a user interface. Entering includes selecting an icon containing a graphic symbol representative of a geometric dimension and tolerance characteristic.

BRIEF DESCRIPTION OF THE DRAWINGS

Referring now to the drawings wherein like elements are numbered alike:

FIG. 2 is a chart showing various GD&T symbols and the corresponding characteristic;

FIG. 3 depicts an exemplary document feature control frame;

FIG. 4 depicts three exemplary document feature control frames containing one datum, multiple datums and no datums;

FIG. 22 depicts another exemplary user interface for reporting results;

FIG. 23 depicts another exemplary user interface for reporting results; and

DETAILED DESCRIPTION

Figure 1:
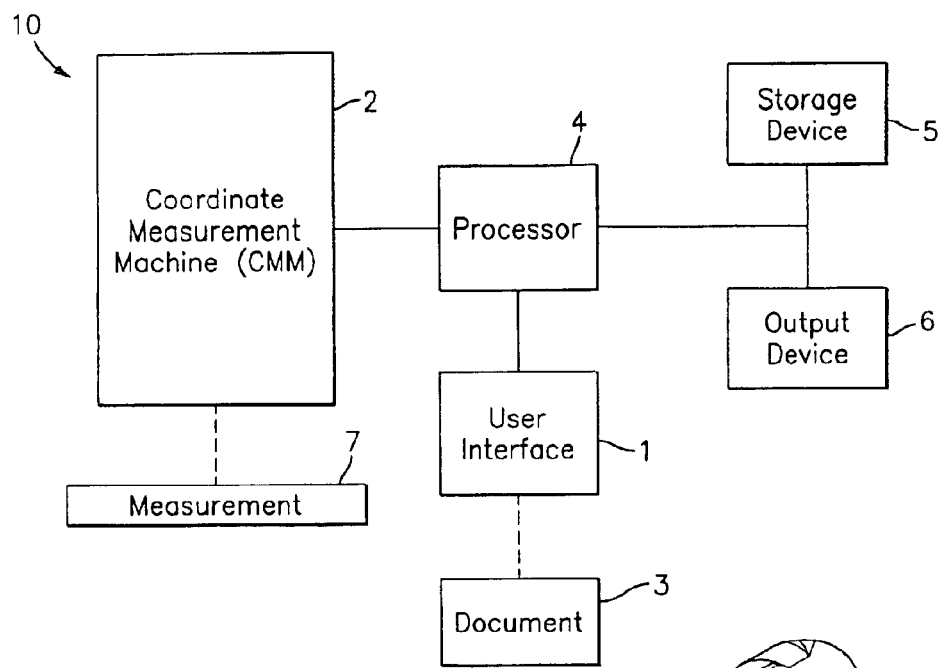
FIG. 1 is a block diagram of an exemplary system for assisting a user taking measurements using a CMM.

FIG. 1 is a block diagram of an exemplary system 10 for assisting a user taking measurements of a target 7 using a coordinate measurement machine (CMM) 2. Target 7 is a part or other object to be tested to determine whether it conforms to GD&T requirements that were defined at design-time. Document 3 contains GD&T data (specifications) of one or more features of target 7 and CMM 2 measures these features on target 7.

As disclosed herein, document 3 may also be representative of GD&T data that is communicated to the user orally or embedded into a digital definition of the target, e.g., in a CAD/CAM database. System 10 may include a processor 4 in operative communication with the CMM 2 providing a user interface 1 to receive a feature measurement and corresponding GD&T data, and to determine whether the measured feature is acceptable based on the GD&T data.

User interface 1 may include a monitor, touchscreen, keyboard, mouse and/or the like. Also, the user interface 1 may include a suitable format for allowing the user to follow prompts, select icons, enter data and review the results. In one embodiment, the user interface 1 may include a user interface showing a feature control frame 28 for accessing dialog boxes to aid the user in selecting icons, entering GD&T data and reviewing the results.

Processor 4 may be implemented using a general-purpose computer executing a computer program for carrying out the processes described herein. Alternatively, processor 4 may comprise a digital signal processor or microprocessor embedded in a special purpose system 10. Processor 4 may be in operative communication with storage device 5 for storing data, and to output device 6 for displaying, printing, and/or transmitting data. Storage device 5 may be a mass storage device located locally or accessed via a network. Alternatively or additionally, storage device 5 may comprise random access memory, or other machine readable media, such as FLASH RAM or optical memory. Processor 4 executes software applications that may be implemented through computer programs. The computer programs and related data may be stored on the processor 4 and/or may be stored on the storage device 5.

System 10 includes software that enables processor 4 to perform complex calculations to assist a user in determining a part's compliance with design documents and GD&T requirements. As described herein, the need for a user to make critical measurement decisions and perform difficult calculations is eliminated. Therefore, the necessity for a user who has technical skills and/or GD&T training is removed. In one embodiment, user interface 1 allows the user to simply follow prompts, select icons, enter data and review the results. Therefore, an untrained or inexperienced person may use CMM 2 to determine a part's compliance with design and GD&T criteria with minimal instruction.

Figure 1A:
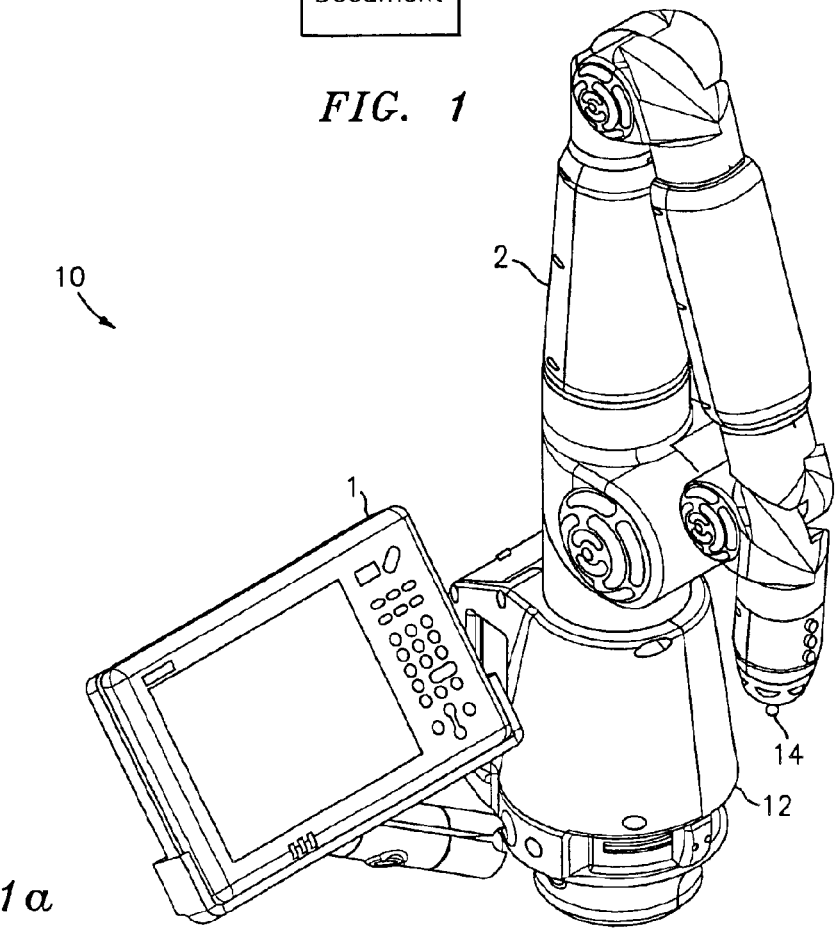
FIG. 1a is an example of the system of FIG. 1 according to one embodiment.

FIG. 1a shows an exemplary embodiment of system 10 including a CMM 2 comprising an articulated arm and a user interface 1 comprising a touch screen and keypad. Processor 4 and other components of CAMM system 10 not shown in FIG. 1a may be located within the housing of user interface 1 or externally thereto. In this embodiment, CMM 2 is an articulated arm having a base 12 at one end and a probe 14 at an opposite end. A series of joints are provided along the length of the articulated arm allowing probe 14 to be positioned at any point within reach of the articulated arm. At each joint, one or more transducers measure the angular displacement of the succeeding portion of the arm relative to the preceding portion. Each of these measurements are utilized to accurately and precisely determine the position of probe 14 in relative to base 12. Thus, utilizing CMM 2 allows a user to easily measure the position of various features of target 7.

As mentioned, GD&T is a system of dimensioning and tolerancing used in manufacturing. FIG. 2 is a chart showing various symbols used in the GD&T system and their corresponding meanings. In the ASME Y14.5M-1994 and ISO 1101 standards, GD&T data is presented in mechanical drawings in the format of a document feature control frame 20 as shown in the example of FIG. 3. In FIG. 3, the exemplary document feature control frame 20 is for parallelism. Document feature control frame 20 includes a first section 22 containing a GD&T symbol from FIG. 2, and a second section 24 for indicating the tolerance. Additional sections may be utilized for providing references to datums.

Datums are points, lines, planes, cylinders, axes, etc., from which the location or geometric relationship of other target features may be established or related. In cases where a datum is not touchable, it may be inferred from datum features. For example, a datum axis which cannot be touched may be established by the extremities or contacting points of a cylindrical surface or the axis formed at the intersection of two planes. Datums that are touchable may be referred to as "datum features." System 10 automatically infers datums from datum features.

In the example shown in FIG. 3, first section 22 contains the GD&T symbol for parallelism, second section 24 indicates that the tolerance is 0.005 and third section 26 contains the letter "A", indicating that the measurements are to be taken with respect to datum A. In other words, the parallelism tolerance of FIG. 3 (the condition of the surface an equal distance to all points from datum plane A) allows a slab-shaped tolerance zone of 0.005 as defined by two parallel planes within which the surface of the feature must lie. Document 3 (FIG. 1) will indicate the location of datum A on target 7 which is defined at design time.

While GD&T data will typically be in document feature control frame format discussed above, GD&T data may also be in other formats such that a person of ordinary skill in the art will be able to transfer the GD&T information to system 10 with little or no training. Document 3 containing GD&T data may be in any form, such as paper or electronic. Typically, document 3 will be a formal engineering drawing of the target being tested and may exist on paper or in computer memory and displayable on a computer display. GD&T data may also exist in a computer database generated by CAD software.

Figure 5:
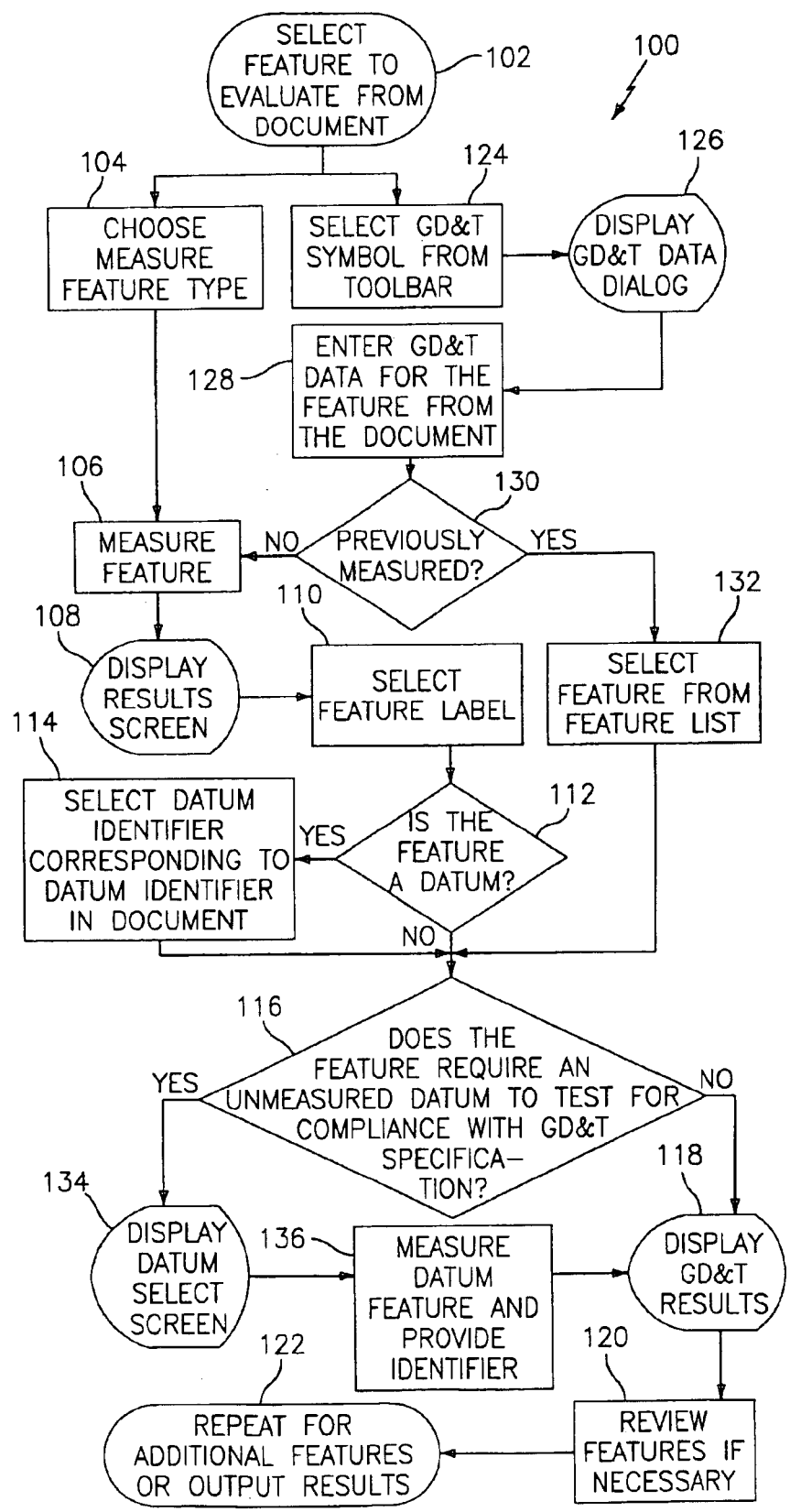
FIG. 5 illustrates an exemplary procedure for assisting a user taking measurements using a CMM.

System 10 provides an intuitive and flexible user interface for entering GD&T data and corresponding measurements, thereby allowing a person with little or no training to test a finished part for compliance with GD&T specifications set forth by the design engineer. FIG. 5 illustrates an exemplary flow diagram 100 of a procedure for assisting a user taking measurements of a target using a CMM 2.

At step 102, a user selects a feature to evaluate for conformance with GD&T specifications. As previously stated, the feature and GD&T data will be provided in document 3 (FIG. 1). The user may choose to first take measurements or first enter the GD&T data. The user may first measure all datum features, and then the features for GD&T testing. Alternatively, the user may choose to first measure feature with having a GD&T specification, then measure any required datums.

If the user selects to first make a measurement, e.g., of a datum, he or she will select "MEASURE" and then the feature type, e.g., a plane or a cylinder. This step is represented at box 104 of flow diagram 100 shown in FIG. 5. Once the desired type of measurement is determined, the procedure follows to box 106 of flow diagram 100 wherein the user will measure the feature as generally known in the art using CMM 2 (FIGS. 1, 1*a*).

Figure 6:
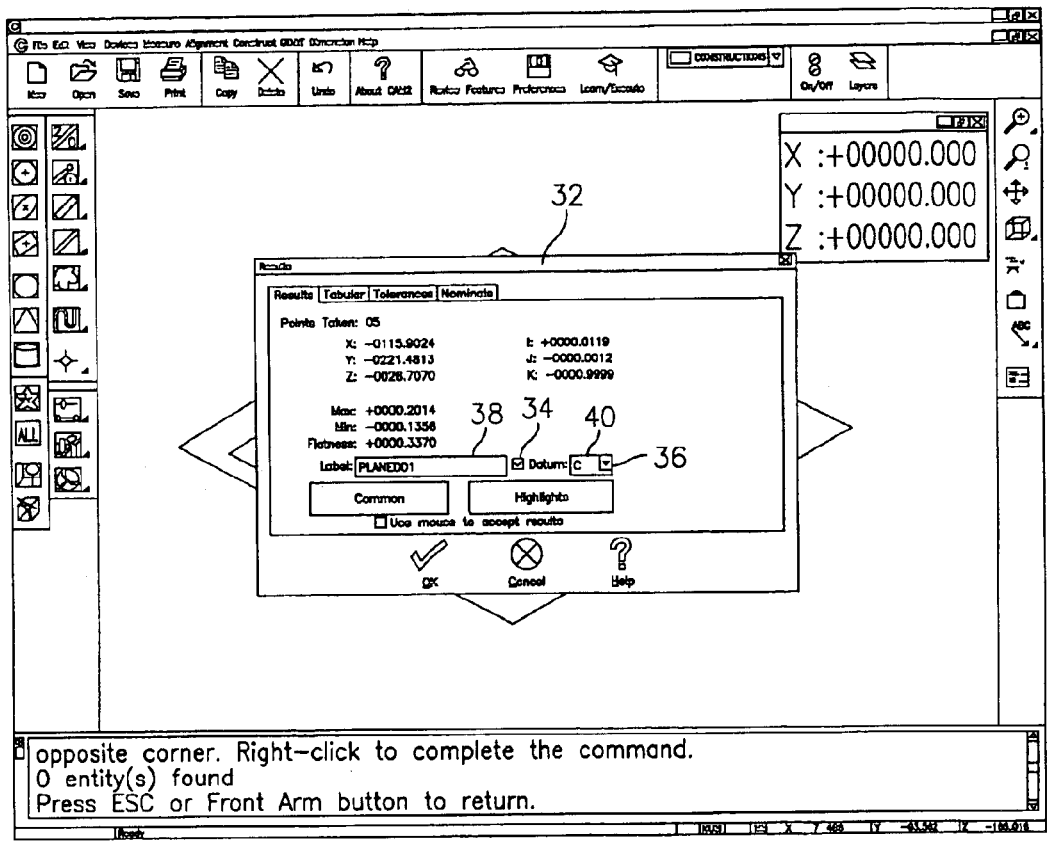
FIG. 6 depicts an exemplary user interface showing a feature results dialog box.

Upon completion of the measurement, the procedure continues to box 108 wherein a results screen is displayed. An exemplary results dialog screen is shown in FIG. 2. Feature results dialog box 32 shown in FIG. 6 displays the location and orientation of the measured feature, in this case a plane.

Referring back to flow diagram 100 shown in FIG. 5, the procedure then proceeds to box 110, wherein the user will select a feature label, i.e., name the feature just measured. In the exemplary results dialog screen shown in FIG. 6, this is done simply by entering the new feature label in label box 38.

The procedure shown in flow diagram 100 (FIG. 5) then proceeds to box 112, wherein the user may determine if the feature just measured is a datum. If the feature is a datum, the procedure then flows to box 114 wherein the user selects a datum identifier. Typically, the user will select a datum identifier that corresponds to the datum identifier of the measured feature in the document. Referring again to FIG. 6, the feature is designated a datum by checking check-box 34. Checking check-box 34 activates datum identifier box 40 allowing the user to enter the datum identifier therein, using, e.g., selector 36. Selector 36 may be a spinner, drop-down list box, or other selector as generally understood in the field of graphical user interfaces. Selector 36 may default to the next previously unassigned letter beginning with "A". In other words, the selector 36 may include an alphabetically ascending list, wherein previously assigned datums do not appear in the datum identifier box 40. In the exemplary results screen shown in FIG. 2, the feature having the label PLANE001 is designated as datum since checkbox 34 is checked. Furthermore, PLANE001 has been identified as datum C since the letter "C" appears in datum identifier box 40.

A datum feature having now been measured and assigned a label and datum identifier, the procedure outlined in flow diagram 100 shown in FIG. 5 proceeds to box 116. Here, system 10 determines whether the feature requires an unmeasured datum to test for compliance with a GD&T specification. Since no GD&T specification (i.e., GD&T data) has been entered, the answer is no, and the procedure proceeds to box 118 wherein a GD&T results dialog box is displayed. The GD&T results dialog comprises a results dialog such as that shown in FIG. 6, but with the addition of a modified document control frame shown by way of example in FIG. 20. The modified document control frame will be explained in further detail below.

Figure 8:
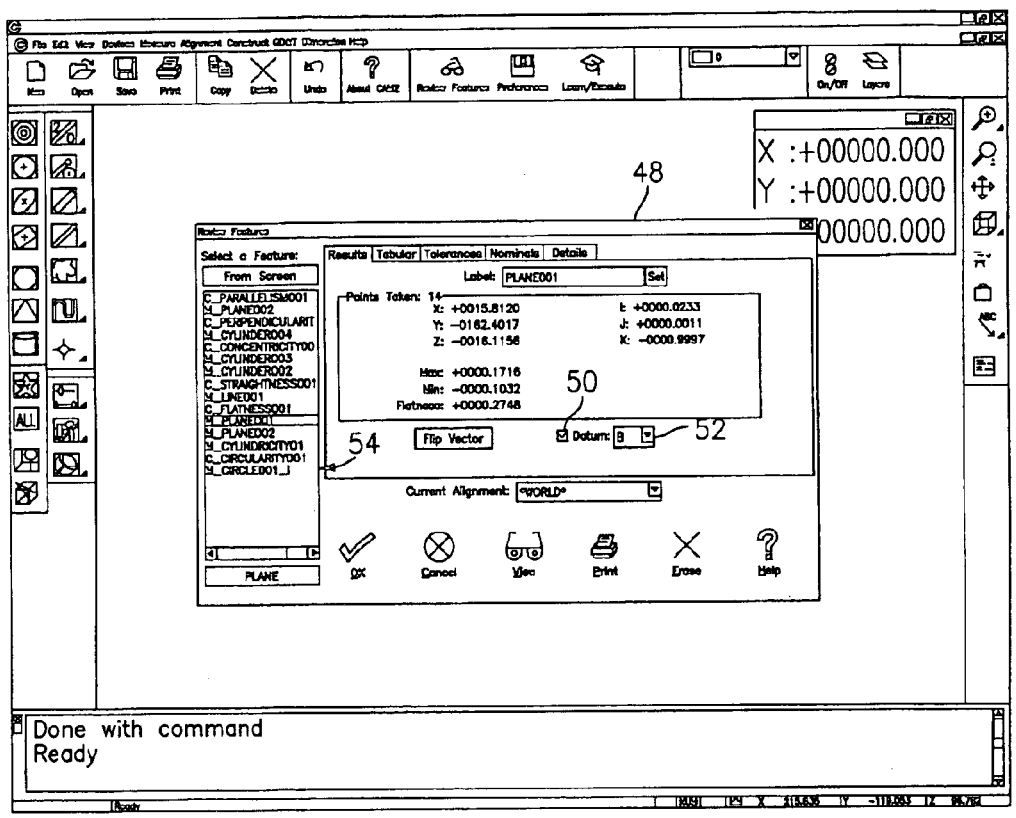
FIG. 8 depicts an exemplary user interface showing a review features dialog box.

Following box 118 in flow diagram 100 shown in FIG. 5, box 120 provides an opportunity for the user to review the features, if necessary. An exemplary review features dialog 48 is shown in FIG. 8. In this example, the position and orientation of PLANE001 is shown which is based on 14 measurements taken.

The user, having now measured a feature, assigned a label to the feature, identified the feature as a specific datum if necessary, and optionally reviewed the measurement data of the feature, is now ready to measure another feature along with associated GD&T data to determine if this new feature meets GD&T specifications defined at design-time.

Figure 7:
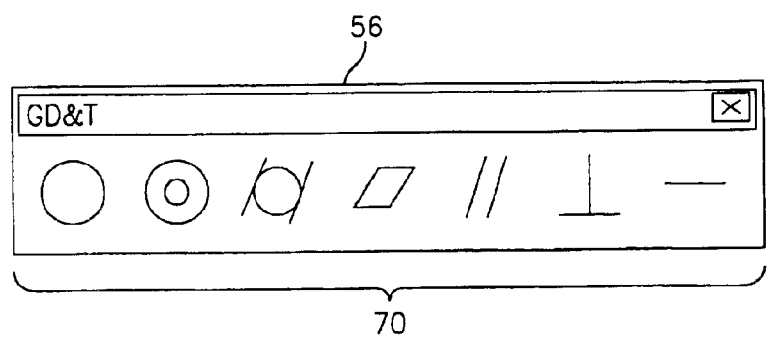
FIG. 7 depicts an exemplary user interface showing a symbol toolbar having symbol icons representing various GD&T symbols.

Thus, beginning again at box 102, the user selects a new feature to be evaluated. This time, however, we assume that the user chooses to first enter in GD&T data prior to measuring the feature. The user therefore proceeds to box 124 wherein he selects a GD&T symbol from a toolbar shown in user interface 1 (FIG. 1, 1a). An exemplary tool bar is shown at FIG. 7 and contains various symbols recognizable from GD&T specifications outlined by ASME and the ISO. As shown in the example of FIG. 7, the user interface 1 may include a symbol toolbar 56 with symbol icons 70 including symbol icons for circularity, concentricity, cylindricity, flatness, parallelism, perpendicularity, and straightness. Other GD&T symbols for additional characteristics may of course be implemented. The user may select one of the symbol icons 70 representative of the GD&T symbol in the corresponding document feature control frame 20 (FIG. 3).

The GD&T symbol icon selected from toolbar 56 will typically correspond to the GD&T symbol shown in the document control frame provided on the document 3 (FIG. 1). In other words, the user is essentially entering the GD&T data from the selected feature by first selecting the GD&T symbol from a user interface element such as toolbar 56 shown in FIG. 7.

Referring back to flow diagram 100 shown in FIG. 5, the procedure then flows to box 126 wherein a GD&T data dialog corresponding to the selected GD&T symbol is displayed. Exemplary GD&T data dialogs 58A–58J for circularity, concentricity, cylindricity, flatness, parallelism, perpendicularity, profile (line), straightness, single position and composite position are respectively shown in FIGS. 9–18. Other dialogs for surface profile, angularity, runout, and symmetry, may of course also be implemented. Each of GD&T data dialogs 58A–58J include a feature control frame 20A–20J, respectively. Each feature control frame 20A–20J has a first section containing the GD&T symbol for the GD&T characteristic being tested which corresponds to the GD&T symbol selected from toolbar 56 shown in FIG. 7. GD&T characteristics for data dialog boxes 58A–58J will be described in further detail below. For now, it is sufficient that the user will enter data into feature control frames 20A–20J corresponding to the GD&T data of the feature being tested.

For example, suppose the user selects the symbol for parallelism from toolbar 56 shown in FIG. 7. Then, the parallelism GD&T data dialog 58E (FIG. 13) will display. Feature control frame 20E shown in GD&T data dialog 58E has a first section containing the symbol for parallelism, a second section in which the user may input the desired tolerance amount, which defines the threshold for pass or fail of the target with respect to that feature. In this case, the user has entered 0.02 as the tolerance amount. (Units are defined elsewhere in the system in a known manner.) Finally, because the GD&T type is "parallelism" the feature being tested must have a datum reference for the parallelism to be tested. In other words, to meet tolerance requirements defined by the GD&T data, the feature must be parallel to another feature of the target within a tolerance of 0.02; that other feature being, by definition, a datum. Here, the user has selected datum C, which may correspond to plane PLANE001 discussed in the example above. However, the user need not recall that datum C is PLANE001. All that is required of the user is to enter the information from the feature control frame in the document 3 (FIG. 1) into feature control frame 20E in GD&T data dialog 58E. This is a significant advantage over prior systems, particularly where the target is complex and has many features to be tested.

The procedure outlined in flow diagram 100 next flows to box 130 wherein the user determines whether the particular feature being tested has previously been measured. If so, the procedure flows to box 132 and the user selects the previously-measured feature. There are two options for selecting the previously-measured feature. The first option is to select the feature from a feature list, which contains the labels of each measured feature. Each GD&T data dialog box 58A–58J contains a corresponding feature selector 74A–74J. This may be implemented in any known manner, e.g., using a drop-down list such as that shown in FIGS. 13–16, or a simple list box such as that shown in FIGS. 17 and 18. Other graphical user interface elements known in the art for selecting an item may of course be used. One useful feature provided by system 10 is that features represented in the feature selector 74A–74J which are designated to be datums may be distinguished by displaying such features in a different font or text style or color from the features that are not designated as datums.

A second option is provided, permitting the user to select the measured feature from the screen, i.e., utilizing a CAD-like interface, the user may select the feature to be tested by pointing to a graphical representation of the feature. Each GD&T data dialog box 58A–58J contains a "select from screen" button 64A–64J. Selecting one of buttons 64A–64J will display a CAD-like interface showing a perspective view of the target. The user simply uses a pointing device such as a mouse or a touch screen to select the feature to be measured on the target.

Figure 9:
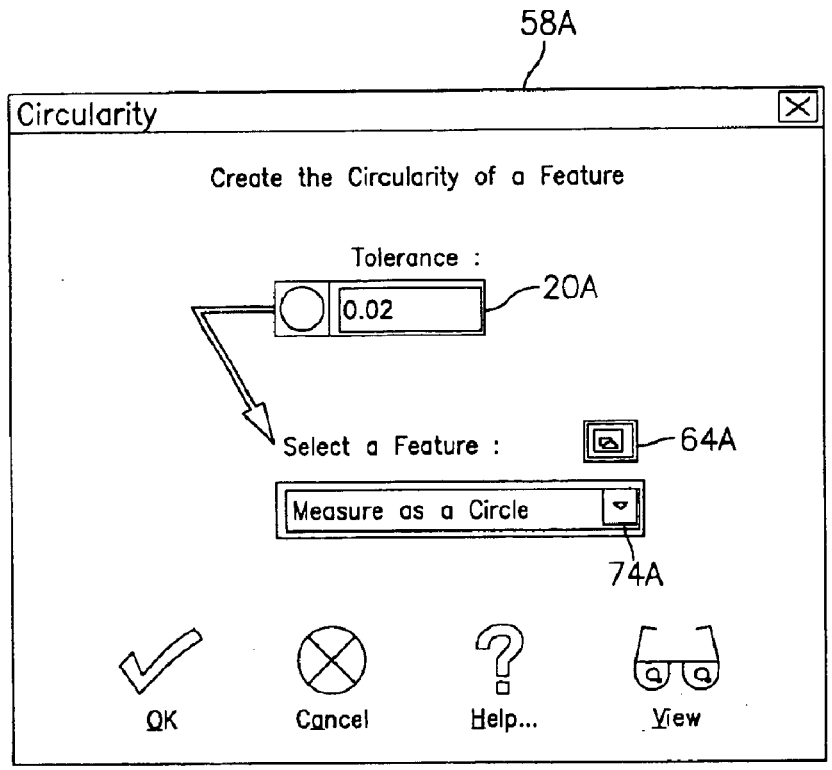
FIG. 9 depicts an exemplary user interface showing tolerance and datum dialog boxes for circularity.

Referring back to box 130 of flow diagram 100 shown in FIG. 5, if the user, after entering GD&T data determines that the feature being tested has not yet been measured, he may select "MEASURE AS CYLINDER", "MEASURE AS PLANE", MEASURE AS LINE" etc. from feature selector 74A–J. For example, FIG. 9 shows a selection "MEASURE AS CIRCLE" displayed in feature selector 74A. When this option is selected and the user clicks or selects "OK", the procedure outlined in flow diagram 100 proceeds to box 106 wherein the user is directed to measure the feature in a manner consistent with what is known in the art. Flow diagram 100 thereafter proceeds as described above from box 106.

After the user selects a feature that has already been measured flow diagram 100 then proceeds to box 116 wherein a determination may be made as to whether the GD&T data entered as described above requires an unmeasured datum. For example, suppose the user indicated that the feature was to be measured with respect to datum C, which was the previously measured plane. Therefore, system 10 will proceed directly to box 118 of flow diagram 100 and display the results. However, if, for example, a datum B was referenced in the feature control dialog 58A–J, and the identifier "B" has not yet been assigned to a feature, then the procedure proceeds to box 134 of flow diagram 100 wherein a datum select dialog such as that shown in FIG. 19 will be displayed. Proceeding to box 136, the user may select a feature to be assigned to Datum B as described above with reference to GD&T data dialog boxes 58A–J. If datum B has not yet been measured, then the user may select "MEASURE AS PLANE", "MEASURE AS CYLINDER" etc from drop down list 74K in the datum select dialog shown in FIG. 19.

At box 118, the computer now has sufficient data to calculate whether or not the measured feature falls within the tolerance specifications defined by the GD&T data entered and a GD&T modified document feature control frame as discussed above is displayed. At the subsequent box 120, a review features dialog 48 as discussed above with respect to FIG. 8 is displayed. Formatted output of multiple features is also available, e.g., by selecting the "PRINT" button in review results dialog 48.

Figures 19, 20:
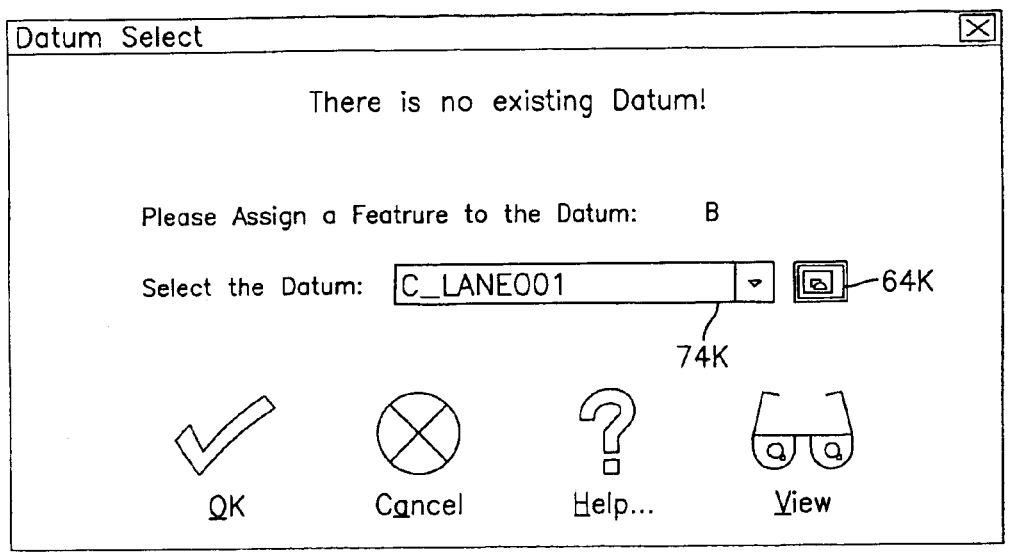
FIG. 19 depicts an exemplary user interface showing a datum select box.
FIG. 20 depicts an exemplary user interface showing tolerance results for a measured feature.

System 10 is capable of providing outputs in various formats. A unique aspect of system 10 is that it can generate a modified feature control frame that displays GD&T data along with corresponding GD&T results. An exemplary modified feature control frame 60 is shown in FIG. 20. Exemplary modified feature control frame 60 includes a top section 80 containing a label for the GD&T data and results; a first section 82 containing the GD&T symbol corresponding to the type of tolerance tested; a second section 84 showing the maximum allowable tolerance; a third section 86 showing the actual deviation amount; and a fourth section 88 showing the amount beyond the allowable tolerance. In the exemplary modified feature control frame 60, the maximum allowable tolerance is 0.030, while actual deviation amounted to 0.026. Since the actual deviation is within the maximum allowable, no value is shown in fourth section 88 of modified feature control frame 60.

Figure 21:
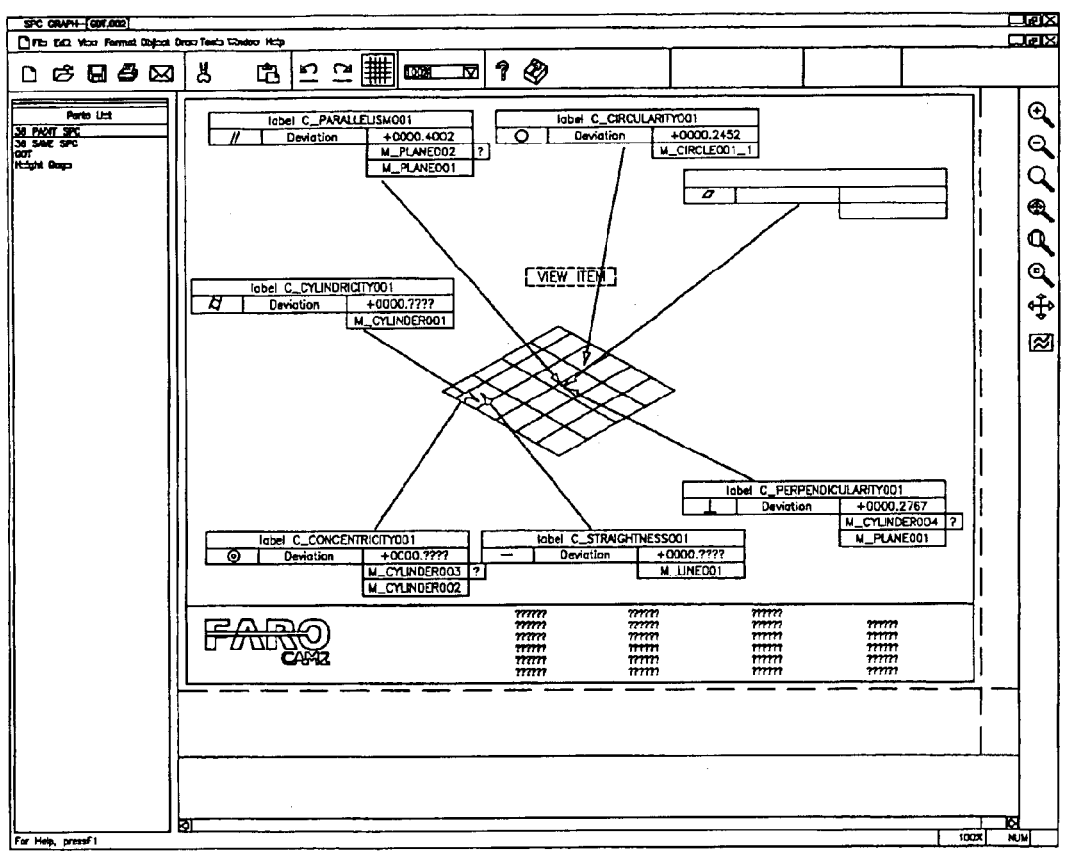
FIG. 21 depicts an exemplary user interface for reporting results.

FIG. 21 shows an exemplary formatted output of a tested target having multiple GD&T tolerances. Target 7 is shown in perspective or isometric view. A list of GD&T data results (not shown) is provided separately which permits the user to select the results to show. As each result is selected from the list, a modified feature control frame is displayed adjacent the feature tested with an arrow extending from the modified feature control frame to the tested feature thereby establishing a visible link between the data and the corresponding feature. Each modified feature control frame may be clicked and "dragged" to a new location on the screen with the arrow continuing to indicate the feature related to the modified feature control frame.

Figure 22:
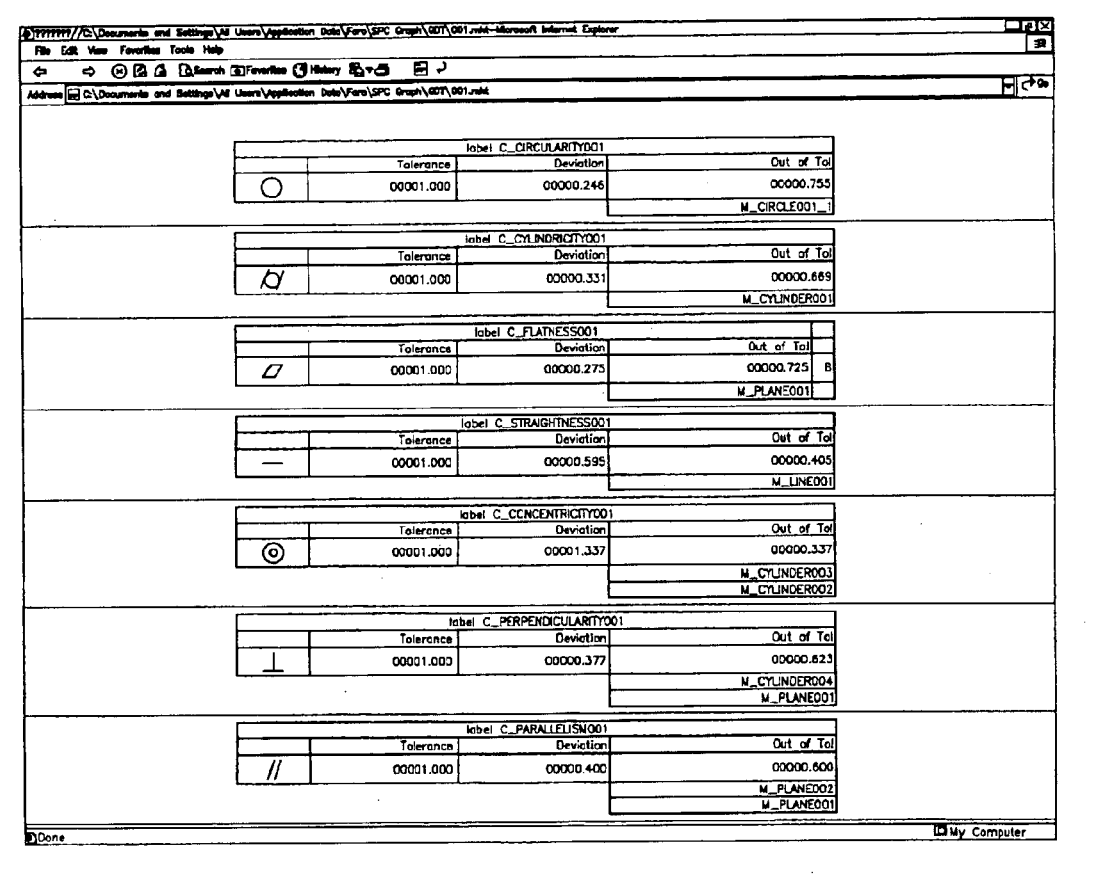

FIG. 22 shows another embodiment of a modified feature control frame which also shows labels of the feature or features tested below the fourth section.

Figure 23:
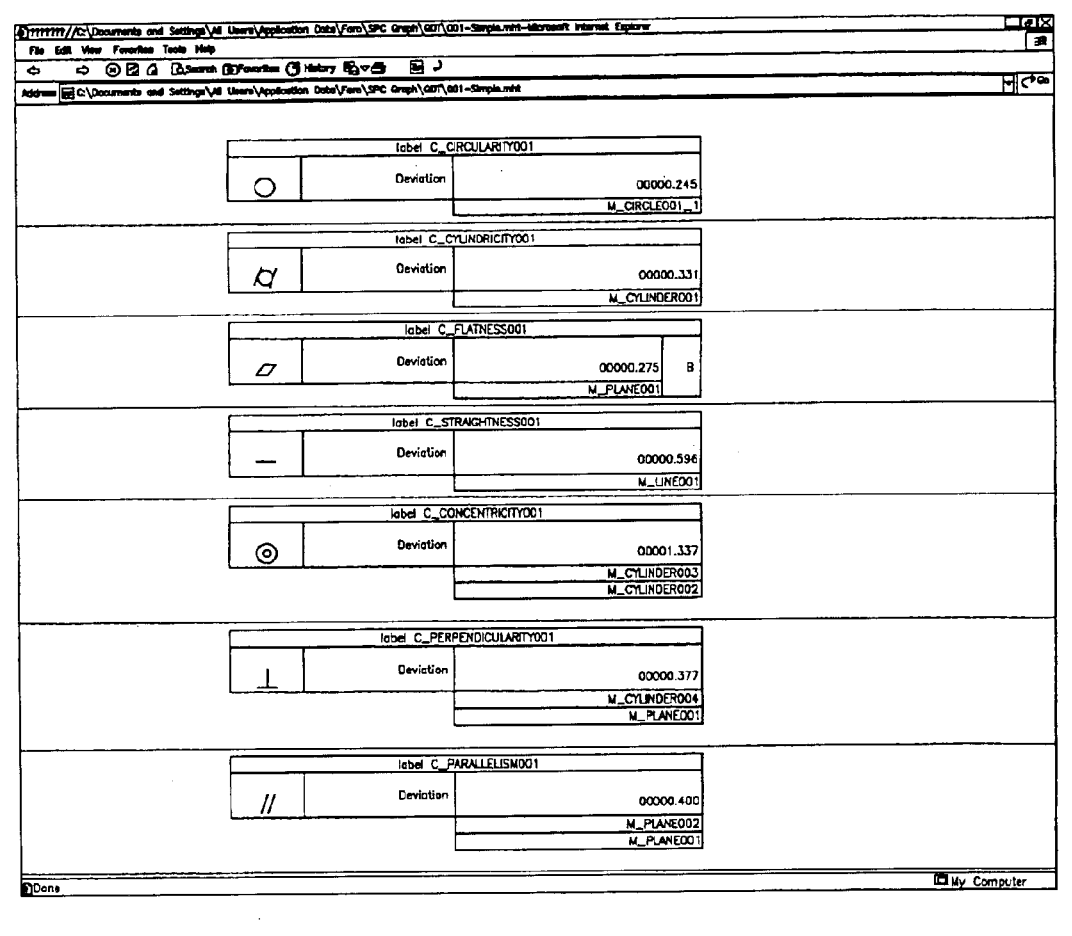

FIG. 23 shows another embodiment of a modified feature control frame in which identifies the actual deviation, but not the allowed maximum deviation or the amount of deviation in excess of the allowed maximum. In this case, whether the actual deviation is within the tolerance may be indicated by displaying feature control frame in a unique color. For example, a green modified feature control frame may indicate that the deviation is within allowable tolerance while a red feature control frame may indicate that the deviation is not within allowable tolerance.

Figure 24:
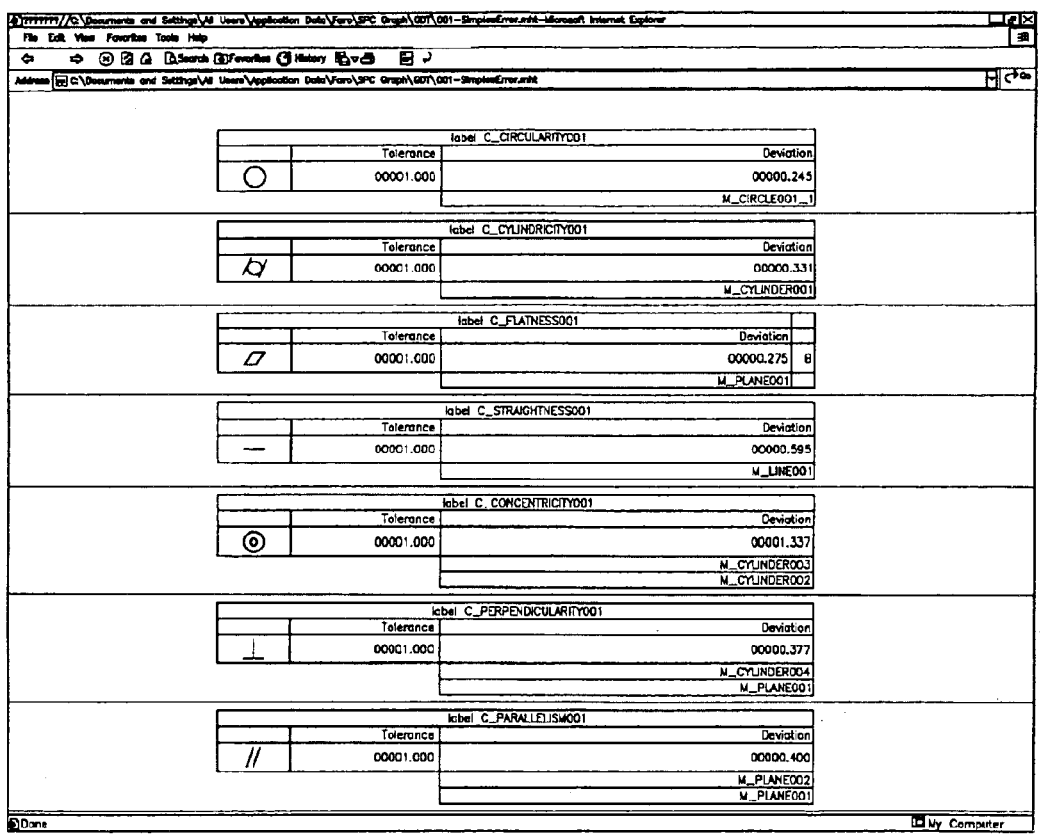
FIG. 24 depicts another exemplary user interface for reporting results.

FIG. 24 shows another embodiment of a modified feature control frame that shows the tolerance, i.e., allowed maximum deviation, and the actual deviation, but not amount of deviation in excess of the allowed maximum.

The user may decide for him- or herself which format of a modified feature control frame to use, and in particular what information is required and what information is superfluous and therefore may be left out, thereby producing a less cluttered output screen.

One advantage of system 10 thus far described is that it consistently utilizes the symbology and language of GD&T standards from input, through measurement and manipulation of data, to output, thereby greatly enhancing the ease of use of the system as a whole. While prior measurement system utilize a technical and arcane database-table format for storing and displaying tolerance information, system 10 as disclosed herein provides a simplified interface that is consistent with itself and real-world applications.

The order for entering and selecting data and taking measurements may be altered without affecting the nature and scope of the invention. For example, other embodiments may include taking the datum measurements at the same time as entering the GD&T data and/or taking feature measurements, or any combination thereof. Other embodiments may also enter and select data in a different order than that described herein. Further, other embodiments may include screens and dialog boxes in an entirely different format and appearance than that described herein, without affecting the nature and scope of the invention.

The following is a more detailed explanation of the various GD&T data dialogs for entering the GD&T data and taking feature measurements. In the following examples, embodiments for determining circularity, concentricity, cylindricity, flatness, parallelism, perpendicularity, position, profile and straightness are presented.

FIG. 9 shows an exemplary GD&T data dialog 58A for circularity. Circularity determines the form of a single feature based on the specific tolerance of a concentric circle. Circularity concerns form only on the surface of a feature, and does not require a datum. However, when measuring for circularity, a measured feature does not have to be perfectly formed as long as its measurements fall within the set tolerance at the cross-sectional point of reference.

Figure 10:
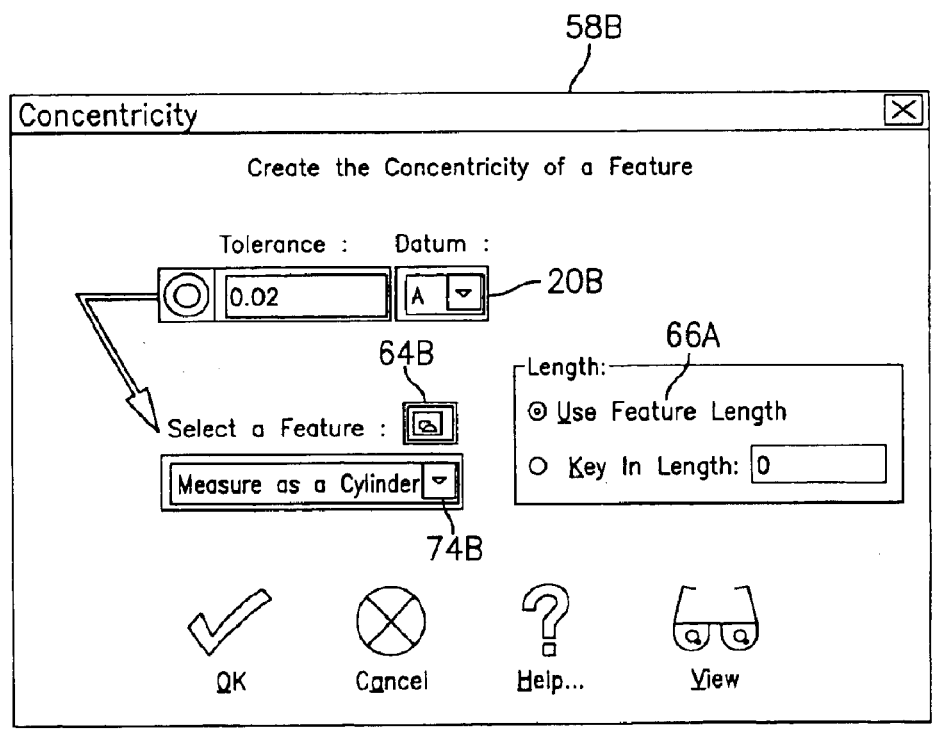
FIG. 10 depicts an exemplary user interface showing tolerance and datum dialog boxes for concentricity.

FIG. 10 shows an exemplary GD&T data dialog 58B for concentricity. Concentricity determines how well a cylinder fits inside of another cylinder. A concentric tolerance is the area where the axis of the measured feature is the same as the axis of the datum. Therefore, the median points of both the feature and the datum must be within the tolerance entered. The user may enter a specific length, or click the USE FEATURE LENGTH 66A option. The entire length of both the datum and the measured feature is important when calculating concentricity.

Figure 11:
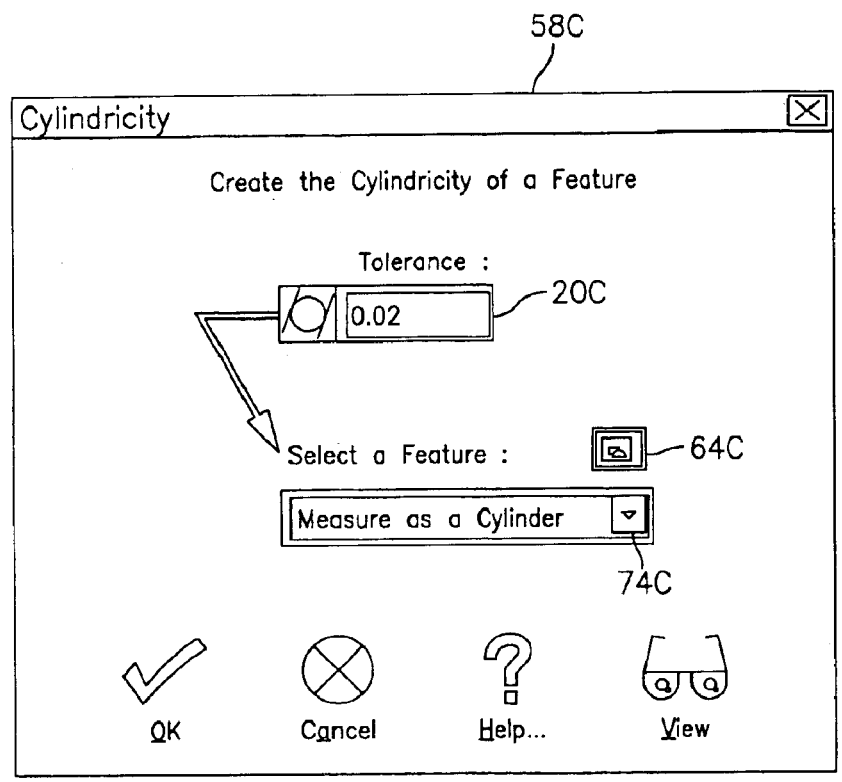
FIG. 11 depicts an exemplary user interface showing tolerance and datum dialog boxes for cylindricity.

FIG. 11 shows an exemplary GD&T data dialog 58C for cylindricity. Cylindricity determines the form at the top and bottom surface of a cylinder. Since cylindricity is based on surface form as it is compared to itself, no datum is required. The tolerance for cylindricity applies to the entire cylinder, therefore, the tolerance is typically based on the diameter of the cylinder at its widest point, rather than being based on a cross section of a single end of the cylinder. The entire cylinder must fit inside the tolerance zone.

Figure 12:
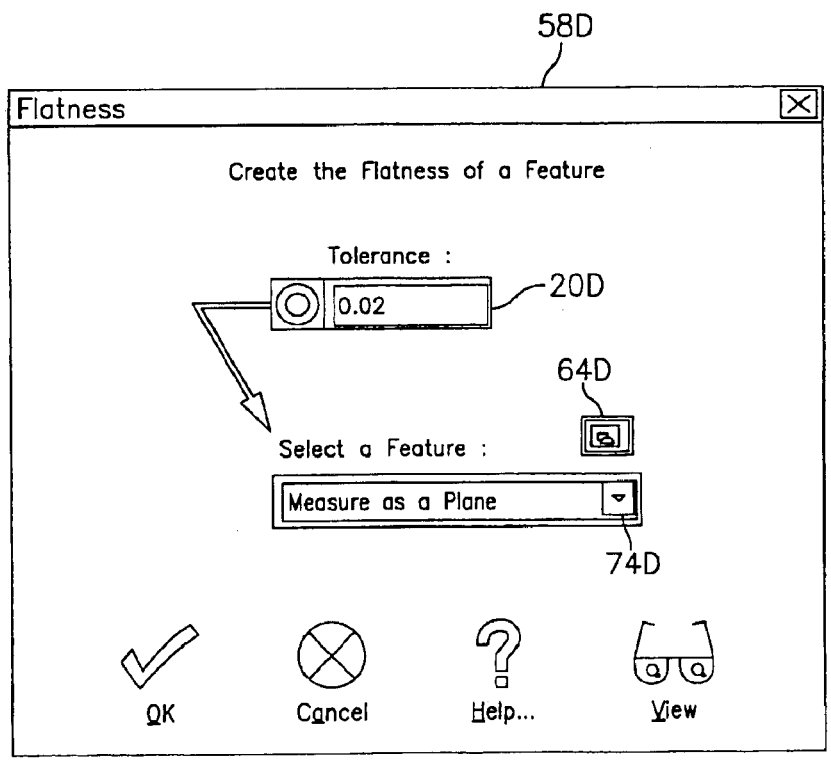
FIG. 12 depicts an exemplary user interface showing tolerance and datum dialog boxes for flatness.

FIG. 12 shows an exemplary GD&T data dialog 58D for flatness. Flatness determines the flatness of a surface that has all its elements in one plane. The entire surface to be measured must fall between two parallel planes, and therefore, no datum is required. Typically, the tolerance is based on the total physical size of the surface being measured. A flatness tolerance is normally less than the target size tolerance because it must fit the two parallel planes of the target.

Figure 13:
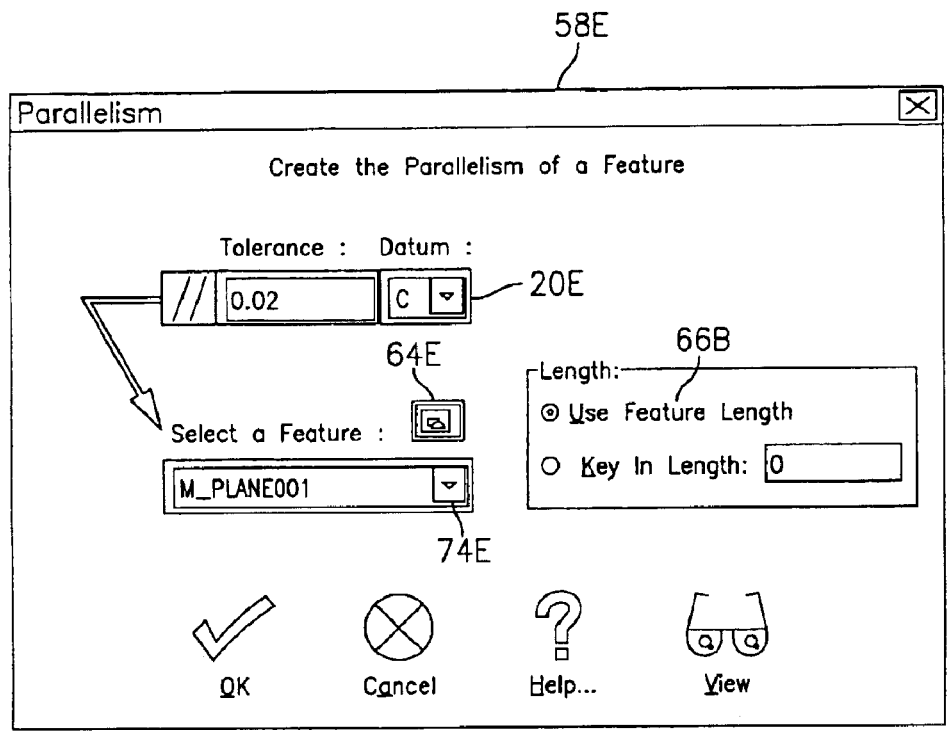
FIG. 13 depicts an exemplary user interface showing tolerance and datum dialog boxes for parallelism.

FIG. 13 shows an exemplary GD&T data dialog 58E for parallelism. Parallelism determines the condition of a surface or center plane or axis that is equal in distance at all points from the datum plane.

Figure 14:
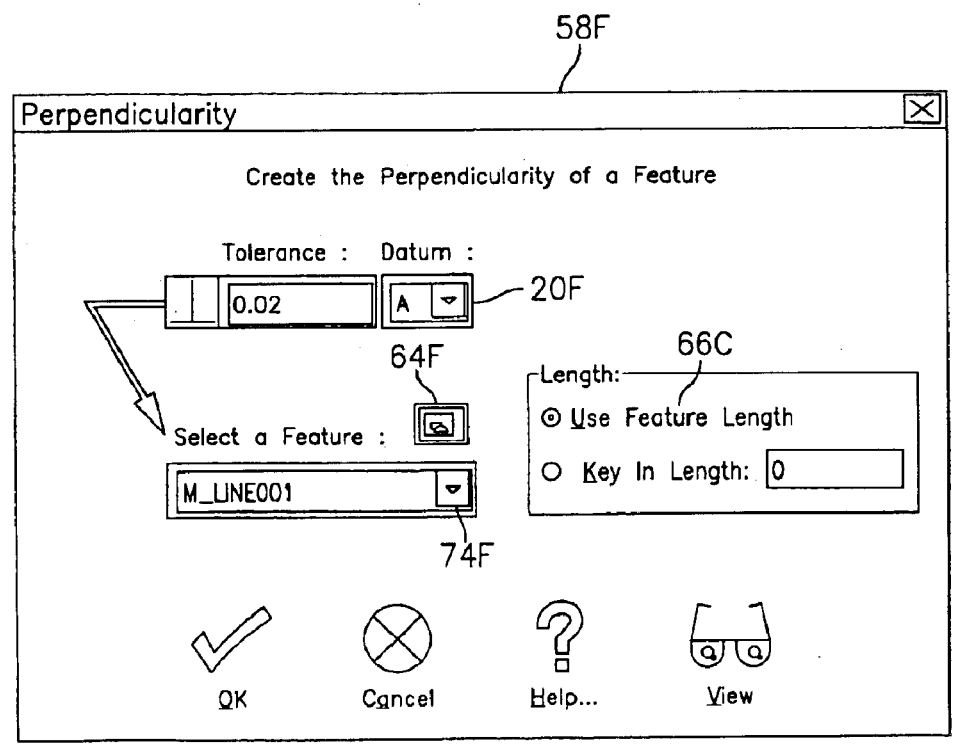
FIG. 14 depicts an exemplary user interface showing tolerance and datum dialog boxes for perpendicularity.

FIG. 14 shows an exemplary GD&T data dialog 58F for perpendicularity. Perpendicularity determines the condition of a surface, center plane, or axis at a right angle (90 degrees) to a datum plane or axis.

Figure 15:
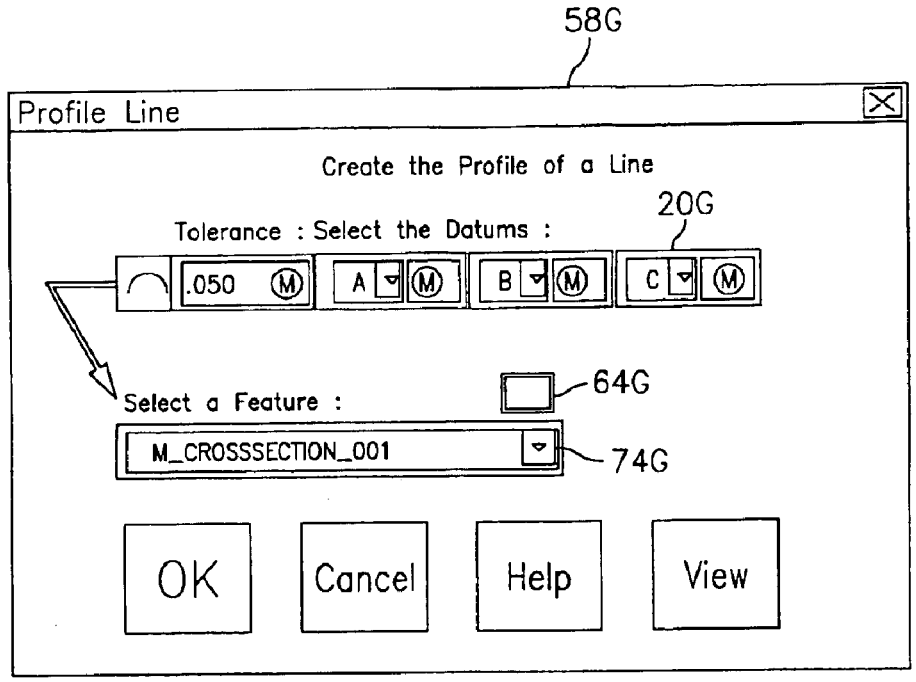
FIG. 15 depicts an exemplary user interface showing tolerance and datum dialog boxes for profile.

FIG. 15 shows an exemplary GD&T data dialog 58G for profile. Profile determines lines, arcs, irregular surfaces or unusually-shaped profiles.

Figure 16:
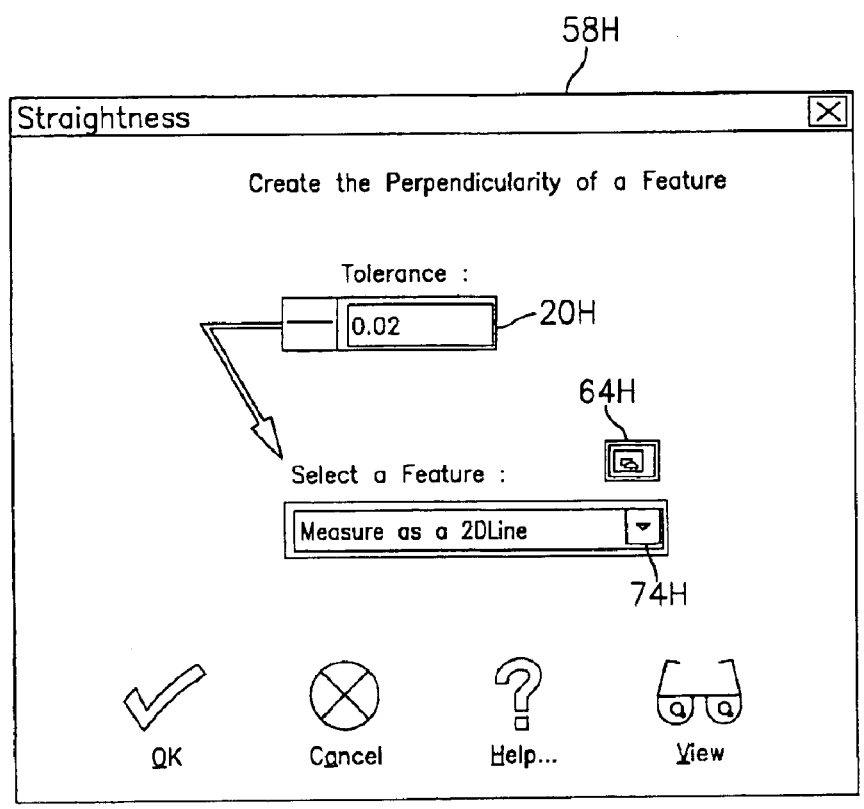
FIG. 16 depicts an exemplary user interface showing tolerance and datum dialog boxes for straightness.

FIG. 16 shows an exemplary GD&T data dialog 58H for straightness. Straightness determines how straight an element of a surface or an axis is, and since the element or axis is measured against itself, no datum is required. Typically, straightness is used to control the form of cylindrical, conical or flat surfaces, and is displayed as a straight line. Typically, the entire surface element is considered because the tolerance zone must be uniformly applied, whether or not the surface element is bowed, constricted, or barrel-shaped.

Figure 17:
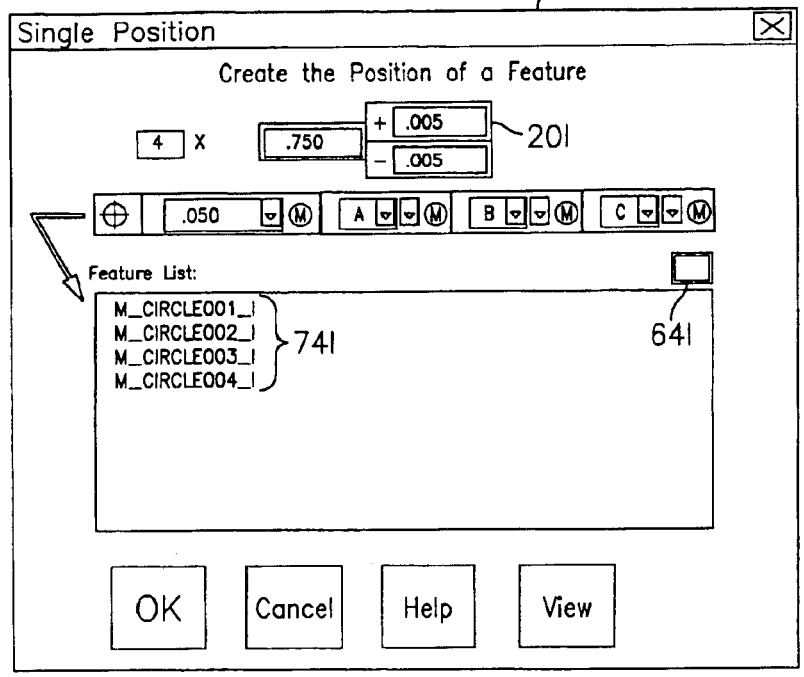
FIG. 17 depicts an exemplary user interface showing tolerance and datum dialog boxes for position.

FIG. 17 shows an exemplary GD&T data dialog 58I for position. Position determines the position of points relative to the datum scheme.

Figure 18:
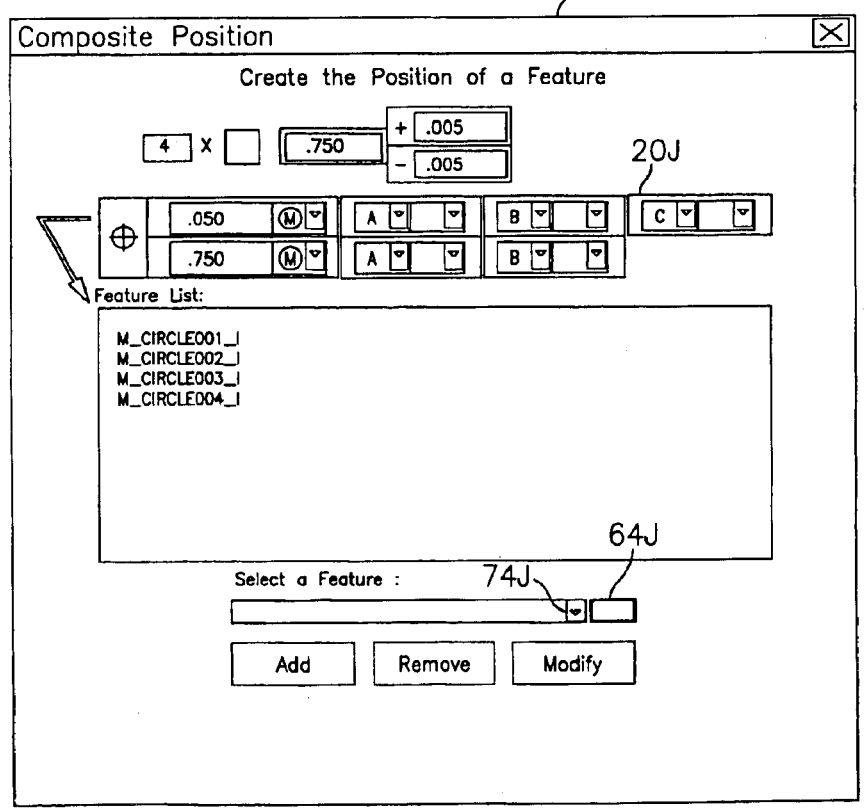
FIG. 18 depicts an exemplary user interface showing a feature control frame and tolerance and datum dialog boxes for composite position.

FIG. 18 shows an exemplary GD&T data dialog 58J for composite position. Composite position also determines the position of points relative to the datum scheme. Composite position results in two values, the difference from position being in the assigned datums in upper and lower section of the feature control frame.

System 10 assists a user taking measurements of a target using a document containing geometric dimensioning and tolerancing data corresponding to the target may comprise: a coordinate measurement machine for measuring a feature on the target to obtain a feature measurement; a processor in operative communication with the coordinate measurement machine for providing a user interface, receiving the feature measurement, receiving the geometric dimensioning and tolerancing data and determining whether the feature measurement is acceptable based on the geometric dimensioning and tolerancing data; a storage device in operative communication with the processor for storing processor data; and an output device in operative communication with the processor for printing or transmitting data.

System 10 may be implemented on a multi-purpose computer using a storage medium encoded with machine-readable computer program code. Likewise, a computer data signal may comprise code configured to cause a processor to implement system 10 using a multipurpose computer. The computer data signal may be embodied in a carrier wave. Further, the computer data signal may be unmodulated.

The description applying the above embodiments is merely illustrative. As described above, embodiments in the form of computer-implemented processes and apparatuses for practicing those processes may be included. Also included may be embodiments in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Also included may be embodiments in the form of computer program code, for example, whether stored in a storage medium, loaded into and/or executed by a computer, or as a data signal transmitted, whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Note that, in this specification and in the appended claims, ordinals such as "first", "second", "third", etc., do not necessarily reflect an order in time, importance, or position, but are merely used to distinguish like elements from one another. Therefore, it is intended that the invention not be limited to the particular embodiments disclosed for carrying out this invention, but that the invention will include all embodiments falling within the scope of the appended claims.

What is claimed is:

1. A method of testing a target object for compliance with existing geometric dimension and tolerance requirements, the method comprising:

measuring a selected feature of said target object;

entering said existing geometric dimension and tolerance requirements into a user interface, said entering comprising selecting an icon containing a graphic symbol representative of a geometric dimension and tolerance characteristic;

determining a deviation of said measured feature from an ideal location;

determining whether said deviation exceeds limits imposed by said geometric dimension and tolerance requirements;

outputting a result as to whether said deviation exceeds said limits, said outputting a results comprises displayed a modified document feature control frame, said modified document feature control frame comprising a first section containing said graphic symbol representative of said geometric dimension and tolerance characteristic, a second section containing said deviation.

2. The method or claim 1, further comprising: displaying a document feature control frame using said user interface in response to said selecting an icon, said document feature control frame corresponding to said geometric dimension and tolerance characteristic being entered.

3. The method of claim 2, wherein entering further comprises entering a tolerance amount in said document feature control frame.

4. The method of claim 2, wherein entering further comprises selecting a datum reference to be displayed in said document feature control frame.

5. The method of claim 2 wherein said existing geometric dimension and tolerance requirements originates from a document having an original document feature control frame containing said existing geometric dimension and tolerance requirements, said original document feature control frame being recreated in said user interface by said selecting an icon and by said entering a tolerance amount from said original document feature control frame into said document feature control frame displayed using said user interface.

6. The method of claim 1 wherein said modified document feature control frame further includes a third section containing said tolerance amount.

7. The method of claim 6 wherein said modified document feature control frame further includes a fourth section containing an amount of said deviation in excess of said tolerance amount.

8. The method of claim 1 wherein said outputting a result comprises displaying a modified document feature control frame, said modified document feature control frame comprising a first section containing said graphic symbol representative of said geometric dimension and tolerance characteristic, and at least one additional section each containing one of said deviation, said tolerance amount, and an amount of said deviation in excess of said tolerance amount.

9. The method of claim 8, said output further comprising an image representative of said target showing said feature thereon, and a line extending from said modified document feature control frame to said feature thereby indicating said feature.

10. A method of testing a target for compliance with an existing geometric dimensioning and tolerance specification, the method comprising:
   entering geometric dimension and tolerance data defining a tolerance zone for a first feature that depends on a position on second feature, said entering comprising selecting a geometric dimensioning and tolerance characteristic that relates said first feature to said second feature, setting a tolerance amount defining a size of said tolerance zone, and selecting a datum identifier thereby designating said second feature as a reference to locate said tolerance zone;
   measuring said first feature and said second feature;
   assigning said datum identifier to said second feature;
   calculating a deviation of said first feature from an ideal location;
   dtermining wherher said deviation exceeds limits of said tolerance zone; and
   displaying a message indicating whether said deviation exceeds said limits wherein said displaying comprising displaying a modified document feature control frame, said modified document feature control frame comprising a first section containing said graphic symbol representative of said geometric dimension and tolerance characteristic, and at least one additional section each containing one of said deviation, said tolerance amount, and an amount of said deviation in excess of said tolerance amount.

11. The method of claim 10 further comprising measuring at least one additional feature and assigning an additional datum identifier to each said at least one additional feature, said tolerance zone being dependent upon said second feature and said at least one additional feature.

12. A system for testing a target object for compliance with existing geometric dimension and tolerance requirements, the system comprising:
   a coordinate measurement machine comprising an articulated arm, said coordinate measurement machine being in electronic communication with a processor;
   a user interface in electronic communication with said processor; and
   software on machine readable media in electronic communication with said processor, said software causing said processor to;
   provide a graphical user interface permitting a user to measure a feature on a target using said coordinate measurement machine and to enter said existing geometric dimension and tolerance requirements into said user interface, said entering comprising selecting an icon containing a graphic symbol representative of a geometric dimension and tolerance characteristic;
   determined a deviation of said measured feature from an ideal location;
   determined whether said deviation exceeds limits imposed by said geometric dimension and tolerance requirements; and
   output a result as to whether said deviation exceeds said limits, said result comprises displaying a modified document feature control frame, said modified document feature control frame comprising a first section containing said graphic symbol representative of said geometric dimension and tolerance characteristic, and a least one additional section each containing one of said deviation, said tolerance amount, and an amount of said deviation in excess of said tolerance amount.

13. The system of claim 12, said software further causing said processor to display a document feature control frame using said user interface in response to said selecting an icon, said document feature control frame corresponding to said geometric dimension and tolerance characteristic being entered.

14. The system of claim 13, wherein entering further comprises entering a tolerance amount in said document feature control frame.

15. The system of claim 13, wherein entering further comprises selecting a datum reference to be displayed in said document feature control frame.

16. The system of claim 12, said output further comprising an image representative of said target showing said feature thereon, and a line extending from said modified document feature control frame to said feature thereby indicating said feature.

17. A system for testing a target object for compliance with existing geometric dimension and tolerance requirements, the system comprising:
   a coordinate measurement machine comprising an articulated arm, said coordinate measurement machine being in electronic communication with a processor;
   a user interface in electronic communication with said processor; and
   software on machine readable media in electronic communication with said processor, said software causing said processor to provide a graphical user interface permitting a user to measure a first feature and a second feature on a target using said coordinate measurement machine and to enter geometric dimension and tolerance data defining a tolerance zone for a first feature that depends on a position of a second feature, said entering comprising selecting a geometric dimensioning and tolerance characteristic that relates said first feature to said second feature, setting a tolerance amount defining a size of said tolerance zone, and selecting a datum identifier thereby designating said second feature as a reference to locate said tolerance zone,
   calculate a deviation of said first feature from an ideal location;
   determine whether said deviation exceeds limits of said tolerance zone; and
   displayed a modified document feature control frame, said modified document feature control frame comprising a first section containing said graphic symbol representative of said geometric dimension and tolerance characteristic, and at least one additional section each containing one of said deviation, said tolerance amount, and an amount of said deviation in excess of said tolerance amount.

* * * * *